(12) United States Patent
Noguchi (10) Patent No.: US 6,867,932 B2
(45) Date of Patent: Mar. 15, 2005

(54) IRIS TYPE LIGHT QUANTITY ADJUSTING DEVICE, LENS DEVICE, AND IMAGE-TAKING APPARATUS

(75) Inventor: Kazuhiro Noguchi, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 17 days.

(21) Appl. No.: 10/175,467

(22) Filed: Jun. 19, 2002

(65) Prior Publication Data

US 2003/0007802 A1 Jan. 9, 2003

(30) Foreign Application Priority Data

Jun. 25, 2001 (JP) ........................................ 2001/191813

(51) Int. Cl.$^7$ .............................. G02B 9/00; G03B 9/10
(52) U.S. Cl. ........................ 359/739; 359/894; 396/493; 396/495
(58) Field of Search ................................ 359/736, 739, 359/740, 894; 396/493, 495

(56) References Cited

U.S. PATENT DOCUMENTS 5,598,244 A * 1/1997 Johansson ................... 396/495
5,953,550 A * 9/1999 Aoshima ..................... 396/458

FOREIGN PATENT DOCUMENTS

JP          H02-48928          4/1990

OTHER PUBLICATIONS

English translation of parts A–D of Japanese Utility Model Laid Open No. H02-48928.

* cited by examiner

Primary Examiner—Scott J. Sugarman
Assistant Examiner—Darryl J. Collins
(74) Attorney, Agent, or Firm—Morgan & Finnegan, LLP

(57) ABSTRACT

An iris type light quantity adjusting device is disclosed that includes:

a plurality of shading blades, each shading blade pivoting around each shaft provided around a fixed opening in a fixed member. At least one shading blade has extended portion overlapping the other shading blade in order to keep overlapping order with the other shading blade that pivots around the shaft not adjacent to the shaft as a pivot of the abovementioned at least one shading blade.

Each of the shading blades has one or none intersection between an outer edge of the shading blade at an outside in the direction orthogonal to the optical axis and a peripheral edge of the fixed opening within an entire pivoting range, and one of a pair of shading blades approaching from substantially opposite directions during pivoting to a closing direction has, at the tip thereof, a shape not overlapping the other shading blade in a closed position.

10 Claims, 11 Drawing Sheets

(PRIOR ART)

(PRIOR ART)

(PRIOR ART)

IRIS TYPE LIGHT QUANTITY ADJUSTING DEVICE, LENS DEVICE, AND IMAGE-TAKING APPARATUS

BACKGROUND OF THE INVENTION

1. Field of the Invention

The present invention relates to an iris type light quantity adjusting device provided in a lens device of an image-taking apparatus such as a video camera or a digital still camera.

2. Description of the Related Art

Image-taking devices such as video cameras and digital still cameras that take moving images or still images using a solid-state image pickup device such as a CCD placed on a focus plane of an image-taking optical system have a lens device including a light quantity adjusting device for adjusting light quantity in image-taking. An "iris type light quantity adjusting device" is a type of such a light quantity adjusting device.

Figure 10:
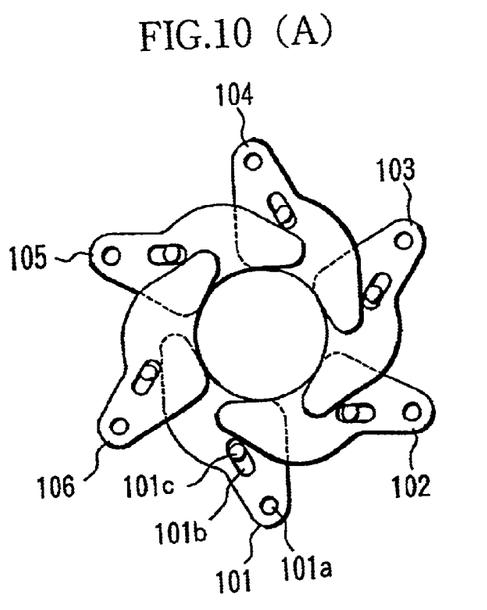
FIGS. 10(A) to (C) show configurations of a conventional iris type diaphragm device.

FIGS. 10(A) to (C) show a configuration of a conventional iris type light quantity adjusting device. FIG. 10(A) shows aperture blades and drive pins in an open state of the iris type light quantity adjusting device having six aperture blades. Reference numerals 101 to 106 denote six aperture blades having the same shape, and the aperture blades 101 to 106 are arranged to successively overlap in part from the aperture blade 101 counterclockwise in the drawing. That is, the blades are successively arranged such that the aperture blade 102 is placed on the aperture blade 101, the aperture blade 103 is placed on the aperture blade 102 . . . , and the aperture blade 106 is placed on the aperture blades 105 and 101. A portion of each aperture blade placed under another aperture blade is shown by a dotted line.

A shaft 110 provided on an unshown fixed plate fits into a hole part 101a provided in a base of the aperture blade 101, and a drive pin 101c formed on a drive ring (not shown) that can rotate around an optical axis fits into a slot part 101b provided in an intermediate portion of the aperture blade 101. The other aperture blades 102 to 106 are supported by the same structure.

The drive ring having the drive pin fitting into the slot rotates around the optical axis, so that the aperture blades interlock with each other and pivot around the shafts formed on the fixed plate outward and inward in a direction orthogonal to the optical axis (radial direction). Thus, as shown in FIGS. 10(A) and 10(B), a central opening formed by all the aperture blades 101 to 106 changes the shape thereof to adjust quantity of light passing through the opening.

Further rotating the drive ring from the state shown in FIG. 10(B), the aperture blades 101 to 106 overlap in order to completely close the central opening.

However, for smooth movement from the state shown in FIG. 10(B) to the state shown in FIG. 10(C), the six aperture blades 101 to 106 are required to keep correct overlapping order such that the aperture blade 102 having no overlapping relationship with the aperture blade 106 in the state of FIG. 10(B) gets under the aperture blade 106, and the aperture blade 101 having no overlapping relationship with the aperture blade 105 in the state of FIG. 10(B) gets under the aperture blade 105.

In FIG. 10(C), the aperture blade 106 is omitted for clarity of a relationship between the aperture blades 101 and 105.

If the aperture blade 102 gets on the aperture blade 106, or the aperture blade 101 gets on the aperture blade 105 when moving from the state of FIG. 10(B) to the state of FIG. 10(C), the order of the six aperture blades 101 to 106 changes to prevent complete closing of the central opening.

In moving image taking, movement of the aperture blades in the above described iris type light quantity adjusting device may follow variation in brightness of a subject and is thus relatively slow.

In shutter operation for taking still images by the iris type light quantity adjusting device in the video camera having a still image recording function or the digital still camera taking the still images, each aperture blade is driven as fast as possible for higher shutter speed.

However, the aperture blade is formed of a thin sheet material for reducing space and driving load, and thus has low rigidity and is light in weight. Therefore, when driven at high speed, the aperture blade may flutter toward the other aperture blades (in an optical axis direction) to tilt the tip thereof or catch air to be raised. In this case, a problem arises that the aperture blade gets on the other aperture blade to prevent complete closing of the opening.

Japanese Utility Model Laid-Open No. 2-48928 proposes aperture blades corresponding to the aperture blades 102 and 106 described with reference to FIGS. 10(A) to (C), a tip of the aperture blade 102 and a base of the aperture blade 106 being extended to overlap for ensuring overlapping order of the aperture blades, thereby preventing bite between the aperture blades.

However, the document has no reference to aperture blades corresponding to the aperture blades 101 and 105, and the risk of bite between the aperture blades still remains.

Even if the aperture blades 101 and 105 are also formed as proposed in Japanese Utility Model Laid-Open No. 2-48928, problems arise as described below with reference to FIGS. 11(A) and 11(B).

Figure 11:
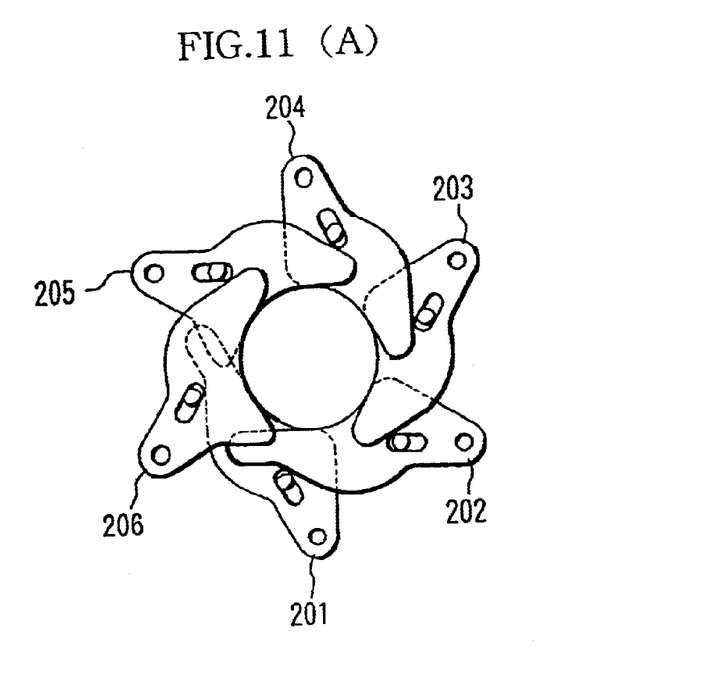

FIG. 11(A) shows aperture blades in an open state of an iris type light quantity adjusting device having six aperture blades. A portion of each aperture blade placed under another aperture blade is shown by a dotted line.

Aperture blades 201 and 202 are aperture blades with extended portions on the tip side, aperture blades 203 and 204 are normal aperture blades (without extended portions), and aperture blades 205 and 206 are aperture blades with extended portions on the base side so as to overlap the respective extended tips of the aperture blades 201 and 202.

In FIG. 11(B), the aperture blade 206 is omitted from FIG. 11(A) for clarity of a relationship between the aperture blades 201 and 205. As shown in FIGS. 11(A) and 11(B), the aperture blades 201 to 206 are arranged to successively overlap in part from the aperture blade 201 counterclockwise in the drawing. That is, the blades are successively arranged such that the aperture blade 202 is placed on the aperture blade 201, the aperture blade 203 is placed on the aperture blade 202, . . . , and the aperture blade 205 is placed on the aperture blade 204 and 201, and further, as shown in FIG. 11(A), the aperture blade 206 is placed on the aperture blades 205 and 202.

In the open state shown in FIG. 11(A), the tip of the aperture blade 202 gets under a base side portion of the aperture blade 206, and the tip of the aperture blade 201 gets under a base side portion of the aperture blade 205, thereby protecting the aperture blade 202 or 201 from getting on the aperture blade 206 or 205 to prevent complete closing.

Figure 12:
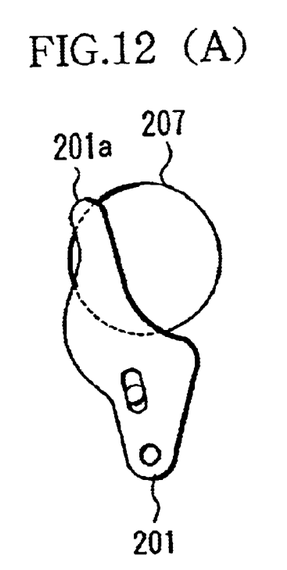
FIGS. 12(A) to (C) illustrate problems in the conventional iris type diaphragm device.

However, the aperture blade 201 is placed in the lowermost position, thus, as shown in FIGS. 12(A) to 12(C), an extended tip 201a (FIG. 12(A)) originally placed in an upper side of a fixed opening 207 (inside in an optical axis direction) formed in an unshown fixed plate may extend, by the deflection thereof, toward a lower side of the fixed plate (outside in the optical axis direction) through the fixed opening 207 (FIG. 12(B)). In this case, while each aperture blade opens from a closed state, the tip 201a of the aperture blade 201 catches a periphery of the fixed opening 207 in the fixed plate to prevent opening of the aperture blade 201.

The aperture blade 202 is placed between the aperture blades 201 and 206, so that inconvenience as described above does not occur.

As shown in FIG. 12(C), the extended tip 201a of the aperture blade 201 overlaps the opposite aperture blade 204 at a closed position, the overlapping order thereof appearing only in a near-closed state. However, if the tip 201a of the aperture blade 201 gets on the aperture blade 204, complete closing is prevented.

A relationship between the tip of the aperture blade 202 and the aperture blade 205 is also the same, thus preventing complete closing by the aperture blade getting on the other aperture blade.

SUMMARY OF THE INVENTION

The present invention has an object to provide an iris type light quantity adjusting device having a plurality of shading blades, that keeps original overlapping order of shading blades even in high speed driving by shutter operation, prevents bite between the shading blades, and allows reliable and smooth opening and closing.

In order to attain the above described object, a light quantity adjusting device according to the invention includes:

a fixed member, the fixed member having a fixed opening for light to pass through, and a plurality of shafts being placed around the fixed opening;

a plurality of shading blades, each shading blade pivoting around each shaft outward and inward in a direction orthogonal to an optical axis to open and close the fixed opening and to adjust passing light quantity, wherein at least one shading blade among the plurality of shading blades has extended portion overlapping the other shading blade in order to keep overlapping order in an optical axis direction with the other shading blade that pivots around the shaft not adjacent to the shaft as a pivot of the abovementioned at least one shading blade in the circumferential direction of the fixed opening, each of the plurality of shading blades has one or none intersection between an outer edge of the shading blade at an outside in the direction orthogonal to the optical axis and a peripheral edge of the fixed opening within an entire pivoting range of each of the shading blades, and one of a pair of shading blades approaching from substantially opposite directions in the direction orthogonal to the optical axis during pivoting to a closing direction has, at the tip thereof, a shape not overlapping the other shading blade in the closed position.

In the invention, the one of the pair of shading blades approaching from the substantially opposite directions during pivoting to the closing direction may overlap, at the tip thereof, the other shading blade by further pivoting from the closed position to the closing direction.

The plurality of shading blades may consist of three kinds of shading blades: a first shading blade; a second shading blade corresponding to the first shading blade with the extended portion formed on the tip side thereof; and a third shading blade corresponding to the first shading blade with the extended portion formed on the base side thereof.

The plurality of shading blades may consist of two kinds of shading blades: a first shading blade; and a second shading blade corresponding to the first shading blade with the extended portions formed on the tip side and on the base side thereof.

The plurality of shading blades may consist of one kind of shading blade with the extended portions formed on the tip side and the base side thereof.

A lens device may be configured by placing the iris type light quantity adjusting device of the invention in an image-taking optical system.

An image-taking device may be configured that includes the lens device and an image-taking unit for recording an optical image formed by the image-taking optical system of the lens device on an image recording medium.

A detailed configuration of the iris type light quantity adjusting device, lens device, and image-taking apparatus of the invention, the above and other objects and features of the invention will be apparent from the embodiments, described below.

BRIEF DESCRIPTION OF THE DRAWINGS

FIGS. 11(A) and (B) show configurations of a conventional iris type diaphragm device.

DETAILED DESCRIPTION OF THE PREFERRED EMBODIMENTS

Hereinafter, preferred embodiments of the invention will be described in detail with reference to the drawings.

Figure 1:
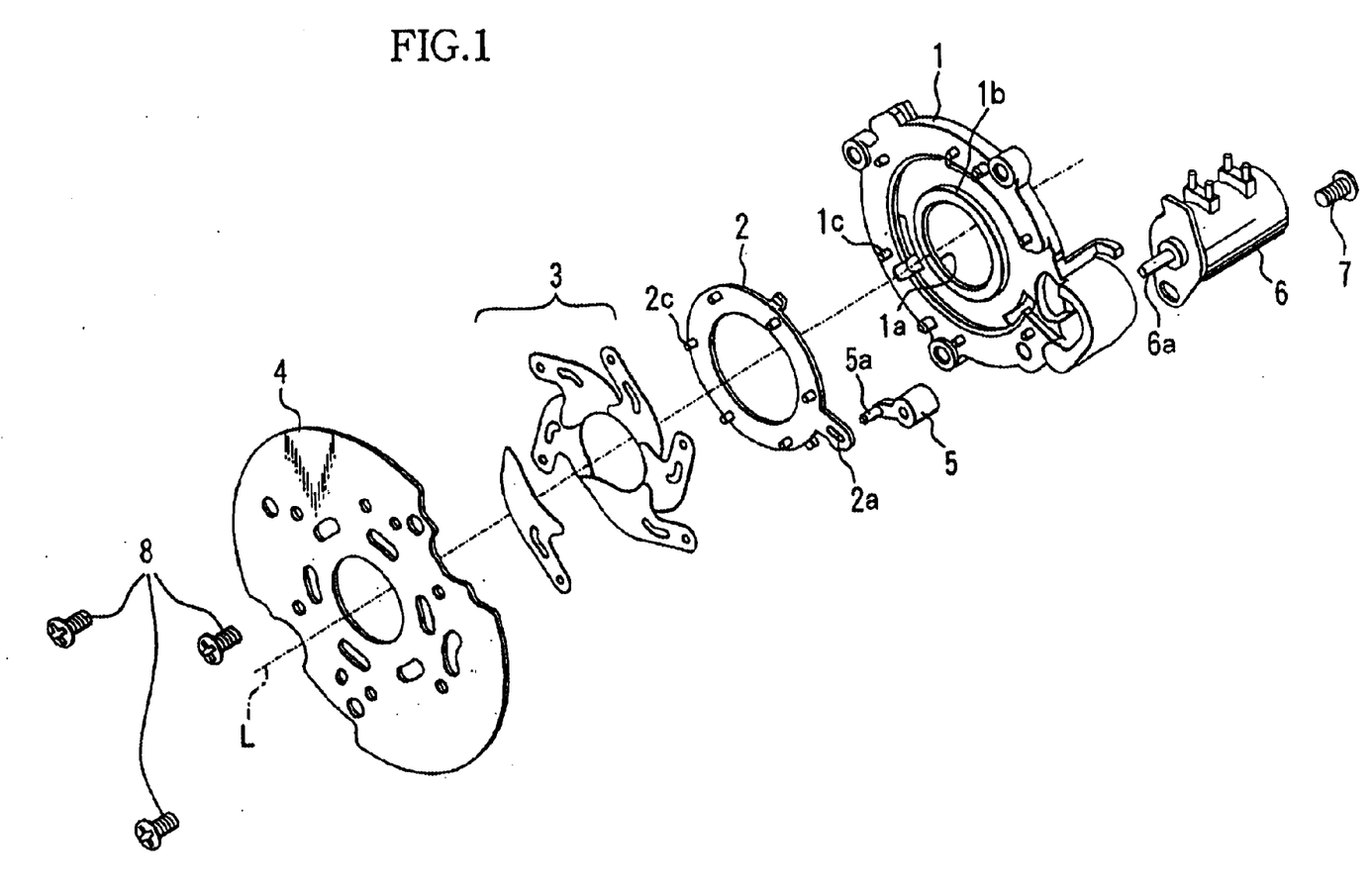
FIG. 1 is an exploded perspective view of an iris type diaphragm device according to an embodiment of the invention.
Figure 2:
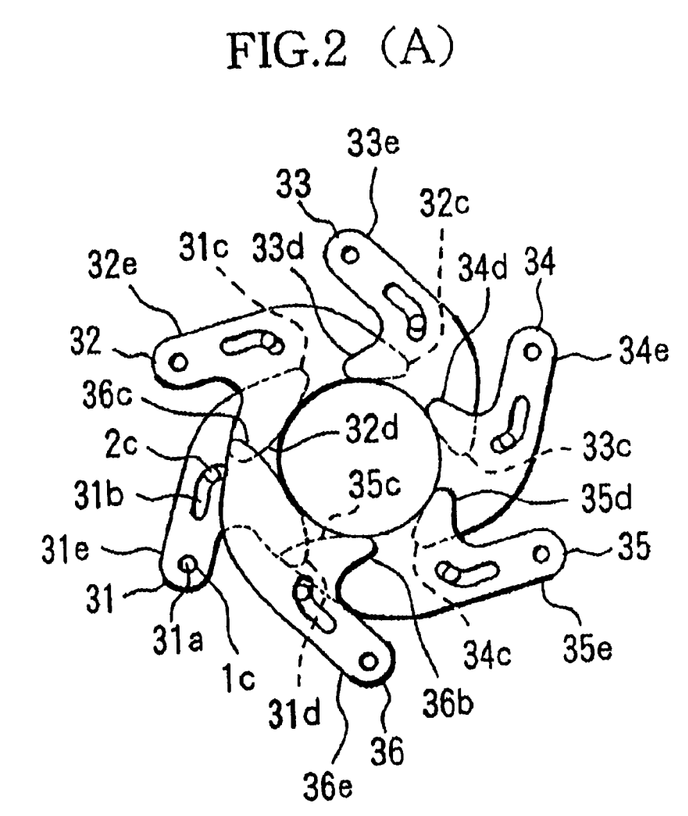
FIG. 2 is a front elevational view of aperture blades used in the iris type diaphragm device in FIG. 1.

FIG. 1 is an exploded view of an iris type diaphragm device (iris type light quantity adjusting device) according to an embodiment of the invention. FIG. 2 is a front elevational view of aperture blades described later. The iris type diaphragm device will be described with reference to FIGS. 1 and 2.

Reference numeral 1 denotes a substrate (fixed member) to be a base of the device, which has a circular fixed opening 1a around an optical axis L formed in the center thereof. Six rotary pins 1c are provided around the fixed opening 1a in the substrate 1.

Reference numeral 2 denotes a drive ring for driving the aperture blades (shading blades) described later, and an inner periphery thereof rotatably fits to an outer periphery of a cylindrical portion 1b formed inside around the fixed opening 1a in the substrate 1.

Reference numeral 3 denotes six aperture blades (reference numerals 31 to 36 in FIG. 2) forming a variable aperture opening. A hole part 31a rotatably fitting to the rotary pin 1c is formed in a base 31e of the aperture blade 31, and likewise, for the other aperture blades 32 to 36, hole parts (no reference numerals) formed in bases 32e to 36e thereof rotatably fit to the rotary pins 1c. At portions between tips 31c to 36c and the bases 31e to 36e of the aperture blades 31 to 36 and closer to the bases, portions extending outward in a width direction of the aperture blades (toward the fixed opening) (hereinafter referred to as base side portions) 31d to 36d are formed.

Reference numeral 4 denotes a holding plate (holding member) which holds the aperture blades 31 to 36 in a space formed between the holding plate 4 and the substrate 1, and a fixed opening 4a around the optical axis is formed in a center thereof. The holding plate 4 is positioned on the substrate 1 and fixed by three screws 8.

Reference numeral 5 denotes a drive lever which drives the drive ring 2, and has a pin 5a fitting into a slot part 2a provided in an outer periphery of the drive ring 2 to rotate the drive ring 2.

Reference numeral 6 denotes a drive motor, and the drive lever 5 is fixed to an output shaft 6a by press fitting or bonding. The drive motor 6 is joined to the substrate 1 by a screw 7.

FIG. 2(A) is a front elevational view in the optical axis direction of the six aperture blades 31 to 36 in the open state. In the description below, a side of the substrate 1 is a "lower" side, and a side of the holding plate 4 is an "upper" side in the optical axis direction.

The aperture blades are arranged to successively overlap in part from the aperture blade 31 clockwise in the drawing. Specifically, in the open state, the aperture blade 32 overlaps on the tip 31c of the aperture blade 31, the base side portion 33d of the aperture blade 33 overlaps on the tip 32c of the aperture blade 32, the base side portion 34d of the aperture blade 34 overlaps on the tip 33c of the aperture blade 33, the base side portion 35d of the aperture blade 35 overlaps on the tip 34c of the aperture blade 34, and the aperture blade 36 overlaps on the tip 35c of the aperture blade 35. Further, in this embodiment, the tip 35c of the aperture blade 35 overlaps on the base side portion 31d of the aperture blade 31, and the tip 36c of the aperture blade 36 overlaps on the base side portion 32d of the aperture blade 32.

In FIG. 2(A), a portion of each aperture blade placed under another aperture blade is shown by a dotted line. In FIG. 2(B), the uppermost aperture blade 36 is omitted for clarity of overlapping between the aperture blades 31 and 35.

As described above, the hole 31a provided in the base of the aperture blade 31 rotatably fits to the rotary pin 1c provided outside around the fixed opening 1a in the substrate 1. A drive pin 2c provided on the drive ring 2 fits into a slot 31b provided in an intermediate portion of the aperture blade 31. The other aperture blades 32 to 36 are supported by the substrate 1 with basically the same configuration.

In the diaphragm device thus configured, when rotation of the drive motor 6 is transferred to the drive ring 2 via the drive lever 5 to rotate the drive ring 2, the aperture blades 31 to 36 pivot in an opening or closing manner (move) around the rotary pins 1c outward and inward in the direction orthogonal to the optical axis via the drive pin 2c provided on the drive ring 2, thereby moving from the open state to a closed state, and further to a completely closed stopping down state of further stopping down from the closed state.

Now, the configurations of the six aperture blades 31 to 36 will be described with reference to FIG. 3(A). A lower part of FIG. 3(A) shows an aperture blade C (first shading blade) having a tip and a base of normal shapes (without extended portion). An upper part shows an aperture blade A (second shading blade) with an extended tip compared to the aperture blade C (with an extended portion at the tip thereof), and a middle part shows an aperture blade B (third shading blade) with an extended base (with an extended portion at the base side portion thereof).

The aperture blades 31, 32 in FIG. 2(A) correspond to the aperture blade B in FIG. 3(A), the aperture blades 33, 34 correspond to the aperture blade C, and the aperture blades 35, 36 correspond to the aperture blade A. That is, the six aperture blades used in the diaphragm device of this embodiment consist of three kinds of aperture blades.

The extended tip 36c of the aperture blade 36 is always placed on the aperture blade 32 with the extended base side portion 32d within an entire pivoting (moving) range from the open state in FIG. 2(A) via the unshown closed state to the unshown completely closed stopping down state, and the extended tip 35c of the aperture blade 35 is always placed on the aperture blade 31 with the extended base side portion 31d, thereby preventing the aperture blades from overlapping in reverse order (for example, the aperture blade 36 gets under the aperture blade 32) and keeping the overlapping order.

Figure 4:
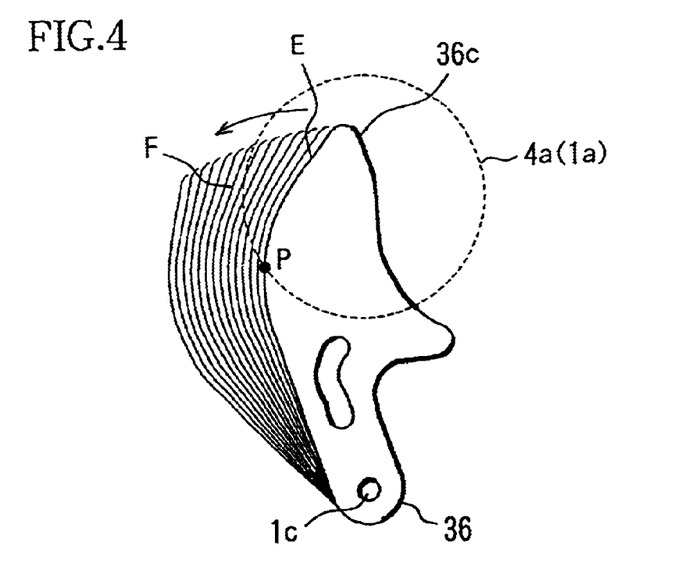
FIG. 4 illustrates a relationship between the aperture blades in FIG. 2 and a fixed opening.

Next, with reference to FIG. 4, the configuration of each aperture blade in respect of relationships with the fixed opening 1a of the substrate 1 and the fixed opening 4a of the holding plate 4 will be described. The single aperture blade shown in FIG. 4 is the aperture blade 36 with the extended tip 36c, which is the uppermost aperture blade among the six aperture blades 31 to 36, and the drawing shows the fixed opening 4a of the holding plate 4 which the aperture blade 36 faces. The fixed opening 1a of the substrate 1 overlaps the fixed opening 4a of the holding plate 4.

In a process where the aperture blade 36 in a completely closed position E pivots in an opening manner in an arrow direction around the rotary pin 1c to increase an area of the opening, an outer edge of the tip side of the aperture blade 36 at the outside in the direction orthogonal to the optical axis and a peripheral edge of the fixed opening 4a always intersect at one point P, and when the aperture blade 36 opens over a position F, the intersection disappears. The outer edge of the tip side of the aperture blade 36 at the outside in the direction orthogonal to the optical axis is gently and smoothly curved.

Thus, even if the tip 36c of the aperture blade 36 is deflected upward (forward of the drawing sheet), that is, toward the fixed opening 4a, the intersection P with the peripheral edge of the fixed opening 4a acts as a guide for retracting the tip 36c of the aperture blade 36 on the underside of the holding plate 4, thereby allowing the aperture blade 36 to pivot to an open end without problems.

The tip 35c of the aperture blade 35 is placed between the aperture blade 31 and the aperture blade 36, and the tips 32c to 34c of the other aperture blades 32 to 34 face the fixed opening 1a of the substrate 1. A relationship between an outer edge of each of these aperture blades at the outside in the direction orthogonal to the optical axis and a peripheral edge of the fixed opening 1a is similar to the relationship between the aperture blade 36 and the fixed opening 4a.

In this embodiment, description is made on the case where the fixed openings 1a, 4a are circular in order to act as fixed apertures that restrict light flux in an unshown image-taking optical system. However, when the fixed opening does not have the function of the fixed aperture, the fixed opening is not limited to a circle (for example, a polygon such as a rectangle is allowed). Also in this case, the same advantage as described above can be obtained by forming an aperture blade such that when the aperture blade pivots in an opening or closing manner, an outer edge of a tip side at the outside in the direction orthogonal to the optical axis and a peripheral edge of a fixed opening intersect at one or none point.

Figure 5:
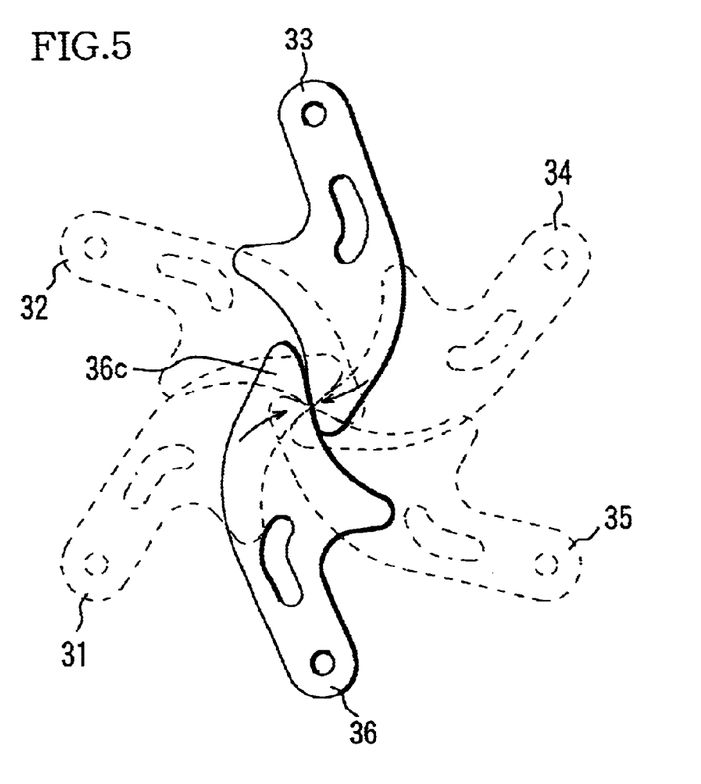
FIG. 5 illustrates shapes of tips of the aperture blades in FIG. 2.

FIG. 5 shows the closed state (the state at the instant when a diameter of the aperture opening becomes almost zero) of the aperture blades 31 to 36. Among them, the aperture blades 33, 36 shown by solid lines approach from substantially opposite directions (the arrow direction in the drawing) in the direction orthogonal to the optical axis in a near-closed state during closing pivoting, and the aperture blade 36 has a shape such that the tip 36c does not overlap the aperture blade 33 in the closed state. In FIG. 5, a portion shown in a contact manner between the aperture blades 33 and 36 corresponds to the center of the optical axis.

In this way, the tip 36c of the aperture blade 36 does not overlap the aperture blade 33 in the closed state in FIG. 5, so that even if the tip 36c of the aperture blade 36 is deflected toward the aperture blade 33, an contacting portion between the aperture blades 33, 36 by further stopping down acts as a guide to ensure stopping down without changing the overlapping order of the blades 33, 36.

Actually, the aperture blades 34 and 35 shown by double-dotted chain lines are placed between the aperture blades 36 and 33, and the aperture blades 31 and 32 shown by double-dotted chain lines are placed in an overlapping manner under the aperture blade 33. Relationships between the other aperture blades approaching from substantially opposite directions in the direction orthogonal to the optical axis in the near-closed state during closing pivoting, that is, relationships between the aperture blades 31 and 34, and between the aperture blades 32 and 35 are similar to the relationship between the aperture blades 33 and 36. Thus, even if the aperture blades 31 to 36 are deflected, or flutter or are raised when driven at high speed, the aperture opening can be reliably closed without changing the overlapping order of these blades 31 to 36.

Figure 6:
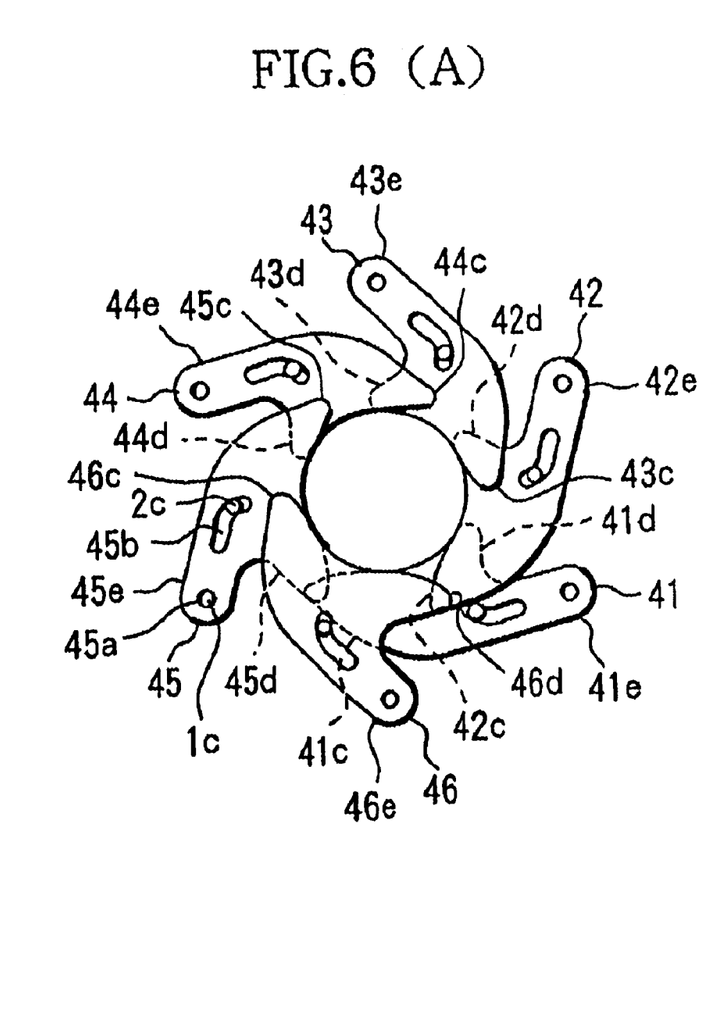
FIG. 6 is a front elevational view of aperture blades used in an iris type diaphragm device according to another embodiment of the invention.

FIGS. 6(A) and (B) show aperture blades in an iris type diaphragm device (iris type light quantity adjusting device) according to another embodiment of the invention. The basic configuration of the iris type diaphragm device of this embodiment is the same as in the above described embodiment, and like component elements will be described with like reference numerals as the above described embodiment, even if they are not shown in the drawings. In this embodiment, arrangement of the aperture blades of the above described embodiment is changed.

FIG. 6(A) is a front elevational view of six aperture blades 41 to 46 forming an aperture opening, in an open state. At portions between tips 41c to 46c and the bases 41e to 46e of the aperture blades 41 to 46 and closer to the bases, portions extending outward in a width direction of the aperture blades (toward the fixed opening) (hereinafter referred to as base side portions) 41d to 46d are formed.

The aperture blades are arranged to successively overlap in part from the aperture blade 41 counterclockwise in the drawing. Specifically, in the open state, the tip 42c of the aperture blade 42 overlaps on the base side portion 41d of the aperture blade 41, the tip 43c of the aperture blade 43 overlaps on the base side portion 42d of the aperture blade 42, the tip 44c of the aperture blade 44 overlaps on the base side portion 43d of the aperture blade 43, the tip 45c of the aperture blade 45 overlaps on the base side portion 44d of the aperture blade 44, and the aperture blade 46 overlaps on the base side portion 45d of the aperture blade 45. Further, in this embodiment, the base side portion 45d of the aperture blade 45 overlaps on the tip 41c of the aperture blade 41, and the base side portion 46d of the aperture blade 46 overlaps on the tip 42c of the aperture blade 42.

In FIG. 6(A), a portion of each aperture blade placed under another aperture blade is shown by a dotted line.

In FIG. 6(B), the uppermost aperture blade 46 is omitted for clarity of overlapping between the aperture blades 41 and 45.

A hole part 45a provided in the base of the aperture blade 45 rotatably fits to a rotary pin 1c provided outside around a fixed opening 1a in a substrate 1. A drive pin 2c provided on a drive ring 2 fits into a slot part 45b provided in an intermediate portion of the aperture blade 45.

The bases 41e to 44e, 46e of the other aperture blades 41 to 44, 46 are supported by the substrate 1 with basically the same configuration, and the aperture blades 41 to 44, 46 are driven by the drive pin 2c provided on the drive ring 2.

Next, the configuration of each aperture blade will be described with reference to FIG. 6(A). The aperture blades 41, 42 correspond to an aperture blade A in FIG. 3(A) with an extended tip, the aperture blades 43, 44 correspond to a normal aperture blade C, and the aperture blades 45, 46 correspond to an aperture blade B with an extended base side portion. That is, the six aperture blades 41 to 46 of this embodiment consist of three kinds of aperture blades.

In the diaphragm device thus configured, the extended tip 42c of the aperture blade 42 is always placed under the aperture blade 46 with the extended base side portion 46d within an entire pivoting range from the open state in FIG. 6(A) via an unshown closed state to an unshown completely closed stopping down state, and the extended tip 41c of the aperture blade 41 is always placed under the aperture blade 45 with the extended base side portion 45d. This prevents the aperture blades from overlapping in reverse order (for example, the aperture blade 46 gets under the aperture blade 42) and keeps the overlapping order.

Relationships between outer edges of the tips 41c to 46c of the aperture blades 41 to 46 at the outside in the direction orthogonal to the optical axis and peripheral edges of the fixed openings 1a, 4a, and relationships between the aperture blades approaching at their tips from substantially opposite directions in a near-closed state during closing pivoting are the same as the above described embodiment.

In the above described two embodiments, descriptions are made on the case where three kinds of aperture blades constitute a six aperture blade group, but when the aperture blades overlap in a reverse direction (clockwise or counterclockwise), the overlapping order of the aperture blades changes.

Figure 3:
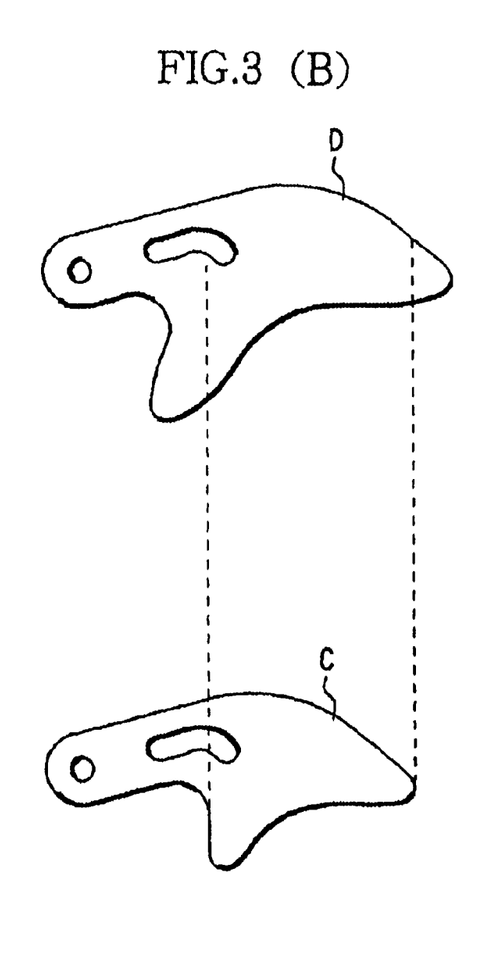
FIG. 3 illustrates shapes of the aperture blades in FIG. 2.

In the embodiment shown in FIGS. 1 to 5, the first two aperture blades correspond to the aperture blade B with the extended base in FIG. 3(A), and in the embodiment shown in FIG. 6(A), the first two aperture blades correspond to the aperture blade A with the extended tip in FIG. 3(A).

In these two embodiments, to prevent the aperture blades from getting on improper aperture blades, aperture blades that may get on the improper aperture blades overlap only at extended adjacent portions thereof, and aperture blades that need no overlapping have the normal shape without extension, thereby reducing load of the aperture blade. However, during assembly, the overlapping order of the three kinds of aperture blades may change, so that caution is required, and the number of assembly steps may increase.

Figure 7:
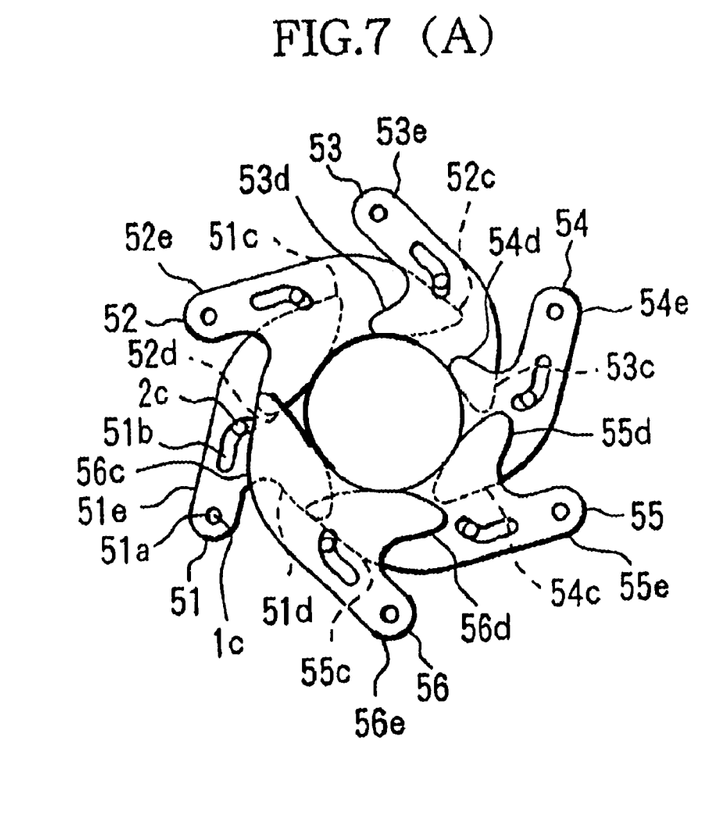
FIG. 7 is a front elevational view of aperture blades used in an iris type diaphragm device according to further embodiment of the invention.

To eliminate such inconvenience, FIGS. 7(A) and (B) show aperture blades used in an iris type diaphragm device (iris type light quantity adjusting device) according to further embodiment of the invention. The basic configuration of the iris type diaphragm device of this embodiment is the same as in the embodiment shown in FIGS. 1 to 5, and like component elements will be described with like reference numerals as the embodiment shown in FIGS. 1 to 5, even if they are not shown in the drawings.

FIG. 7(A) is a front elevational view of six aperture blades, in an open state. Reference numerals 51 to 56 denote six aperture blades forming an aperture opening, and at portions between tips 51c to 56c and the bases 51e to 56e of the aperture blades 51 to 56 and closer to the bases, portions extending outward in a width direction of the aperture blades (toward the fixed opening) (hereinafter referred to as base side portions) 51d to 56d are formed.

The aperture blades are arranged to successively overlap in part from the aperture blade 51 clockwise. Specifically, in the open state, the aperture blade 52 overlaps on the tip 51c of the aperture blade 51, the aperture blade 53 overlaps on the tip 52c of the aperture blade 52, the base side portion 54d of the aperture blade 54 overlaps on the tip 53c of the aperture blade 53, the aperture blade 55 overlaps on the tip 54c of the aperture blade 54, and the aperture blade 56 overlaps on the tip 55c of the aperture blade 55. Further, in this embodiment, the tip 55c of the aperture blade 55 overlaps on the base side portion 51d of the aperture blade 51, and the tip 56c of the aperture blade 56 overlaps on the base side portion 52d of the aperture blade 52.

In FIG. 7(A), a portion of each aperture blade placed under another aperture blade is shown by a dotted line.

In FIG. 7(B), the uppermost aperture blade 56 is omitted for clarity of overlapping between the aperture blades 51 and 55.

A hole part 51a provided in the base 51e of the aperture blade 51 rotatably fits to a rotary pin 1c provided outside around a fixed opening 1a in a substrate 1. A drive pin 2c provided on a drive ring 2 fits into a slot part 51b provided in an intermediate portion of the aperture blade 51.

The bases 52e to 56e of the other aperture blades 52 to 56 are supported by the substrate 1 with basically the same configuration, and the aperture blades 52 to 56 are driven by the drive pin 2c provided on the drive ring 2.

Next, the configuration of each aperture blade will be described with reference to FIG. 3(B). A lower part of FIG. 3(B) shows an aperture blade C having a tip and a base of normal shapes (without extended portion). An upper part shows an aperture blade D with an extended tip and an extended base compared to the aperture blade C (with extended portions at the tip and base side portion thereof).

In FIG. 7(A), the aperture blades 51, 52, 55, 56 correspond to the aperture blade D in FIG. 3(B), the aperture blades 53, 54 correspond to the aperture blade C in FIG. 3(B). That is, the six aperture blades of this embodiment consist of two kinds of aperture blades.

The extended tip 56c of the aperture blade 56 is always placed on the aperture blade 52 with the extended base side portion 52d within an entire pivoting range from the open state in FIG. 7(A) via an unshown closed state to an unshown completely closed stopping down state, and the extended tip 55c of the aperture blade 55 is always placed on the aperture blade 51 with the extended base side portion 51d, thereby preventing the aperture blades from overlapping in reverse order (for example, the aperture blade 56 gets under the aperture blade 52) and keeping the overlapping order.

Relationships between outer edges of the tips 51c to 56c of the aperture blades 51 to 56 at the outside in the direction orthogonal to the optical axis and peripheral edges of the fixed openings 1a, 4a, and relationships between the aperture blades approaching at their tips from substantially opposite directions in a near-closed state during closing pivoting are the same as the embodiment shown in FIGS. 1 to 5.

In this embodiment, the two kinds of aperture blades of the above described embodiments: one with the extended tip and one with the extended base side portion are replaced by the aperture blade with both the extended tip and the extended base, causing only two kinds of aperture blades to be necessary.

Thus, the overlapping order from the bottom is: two aperture blades D, two aperture blades C, and two aperture blades D, which eliminates the problem of an overlapping direction. That is, fewer kinds of aperture blades can constitute the iris type diaphragm device, and the number of assembly steps can be reduced.

Figure 8:
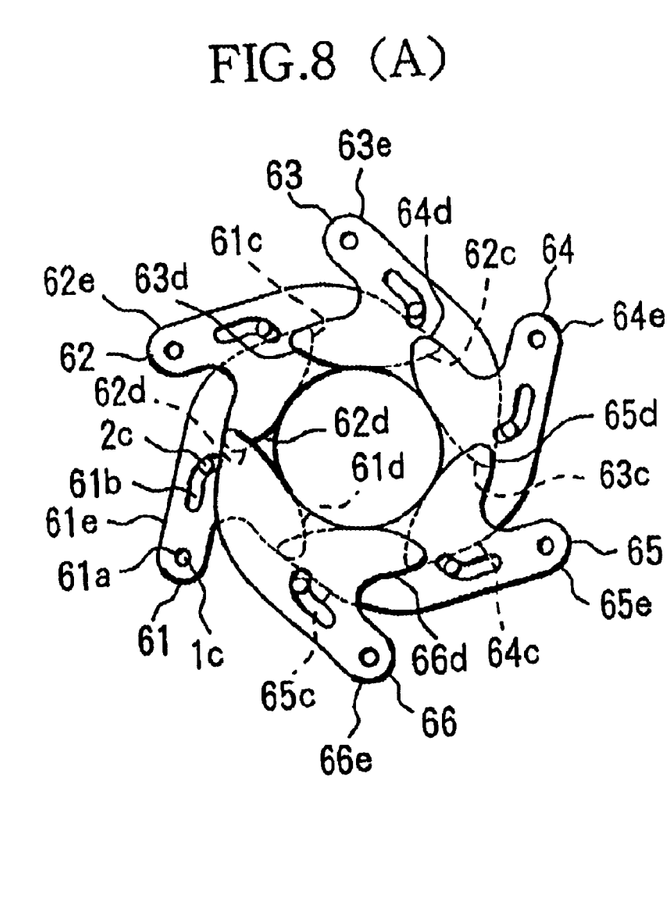
FIG. 8 is a front elevational view of aperture blades used in an iris type diaphragm device according to still further embodiment of the invention.

FIGS. 8(A) and (B) show aperture blades used in an iris type diaphragm device (iris type light quantity adjusting device) according to still further embodiment of the invention. The basic configuration of the iris type diaphragm device of this embodiment is the same as in the embodiment shown in FIGS. 1 to 5, and like component elements will be described with like reference numerals as the embodiment shown in FIGS. 1 to 5, even if they are not shown in the drawings.

FIG. 8(A) is a front elevational view of six aperture blades 61 to 66 forming an aperture opening, in an open state. At portions between tips 61c to 66c and the bases 61e to 66e of the aperture blades 61 to 66 and closer to the bases, portions extending outward in a width direction of the aperture blades (toward the fixed opening) (hereinafter referred to as base side portions) 61d to 66d are formed.

The aperture blades are arranged to successively overlap in part from the aperture blade 61 clockwise in the drawing. Specifically, in the open state, the aperture blade 62 overlaps on the tip 61c of the aperture blade 61, the aperture blade 63 overlaps on the tip 62c of the aperture blade 62, the aperture blade 64 overlaps on the tip 63c of the aperture blade 63, the aperture blade 65 overlaps on the tip 64c of the aperture blade 64, and the aperture blade 66 overlaps on the tip 65c of the aperture blade 65. Further, in this embodiment, the tip 65c of the aperture blade 65 overlaps on the base side portion 61d of the aperture blade 61, and the tip 66c of the aperture blade 66 overlaps on the base side portion 62d of the aperture blade 62.

In FIG. 8(A), a portion of each aperture blade placed under another aperture blade is shown by a dotted line.

In FIG. 8(B), the uppermost aperture blade 66 is omitted for clarity of overlapping between the aperture blades 61 and 65.

A hole part 61a provided in the base of the aperture blade 61 rotatably fits to a rotary pin 1c provided outside around a fixed opening 1a in a substrate 1. A drive pin 2c provided on a drive ring 2 fits into a slot part 61b provided in an intermediate portion of the aperture blade 61.

The bases 62e to 66e of the other aperture blades 62 to 66 are supported by the substrate 1 with the same configuration, and the aperture blades 62 to 66 are driven by the drive pin 2c provided on the drive ring 2.

All the six aperture blades 61 to 66 of this embodiment consist of one kind of aperture blade D with both an extended tip and an extended base side portion shown in FIG. 3(B).

The extended tip 66c of the aperture blade 66 is always placed on the aperture blade 62 within an entire pivoting range from the open state in FIG. 8(A) via an unshown closed state to an unshown completely closed stopping down state, and the extended tip 66c of the aperture blade 66 is always placed on the aperture blade 61, thereby preventing the aperture blades from overlapping in reverse order (for example, the aperture blade 66 gets under the aperture blade 62) and keeping the overlapping order.

Relationships between outer edges of the tips of the aperture blades 61 to 66 at the outside in the direction orthogonal to the optical axis and peripheral edges of the fixed openings 1a, 4a, and relationships between the aperture blades approaching at their tips from substantially opposite directions in a near-closed state during closing pivoting are the same as the embodiment shown in FIGS. 1 to 5.

In this embodiment, the aperture blades of one kind having the same shape constitute the iris type diaphragm device to allow minimum kinds of parts, eliminate the need for caution as to the overlapping order during assembly, and allow significant reduction in the number of steps.

Figure 9:
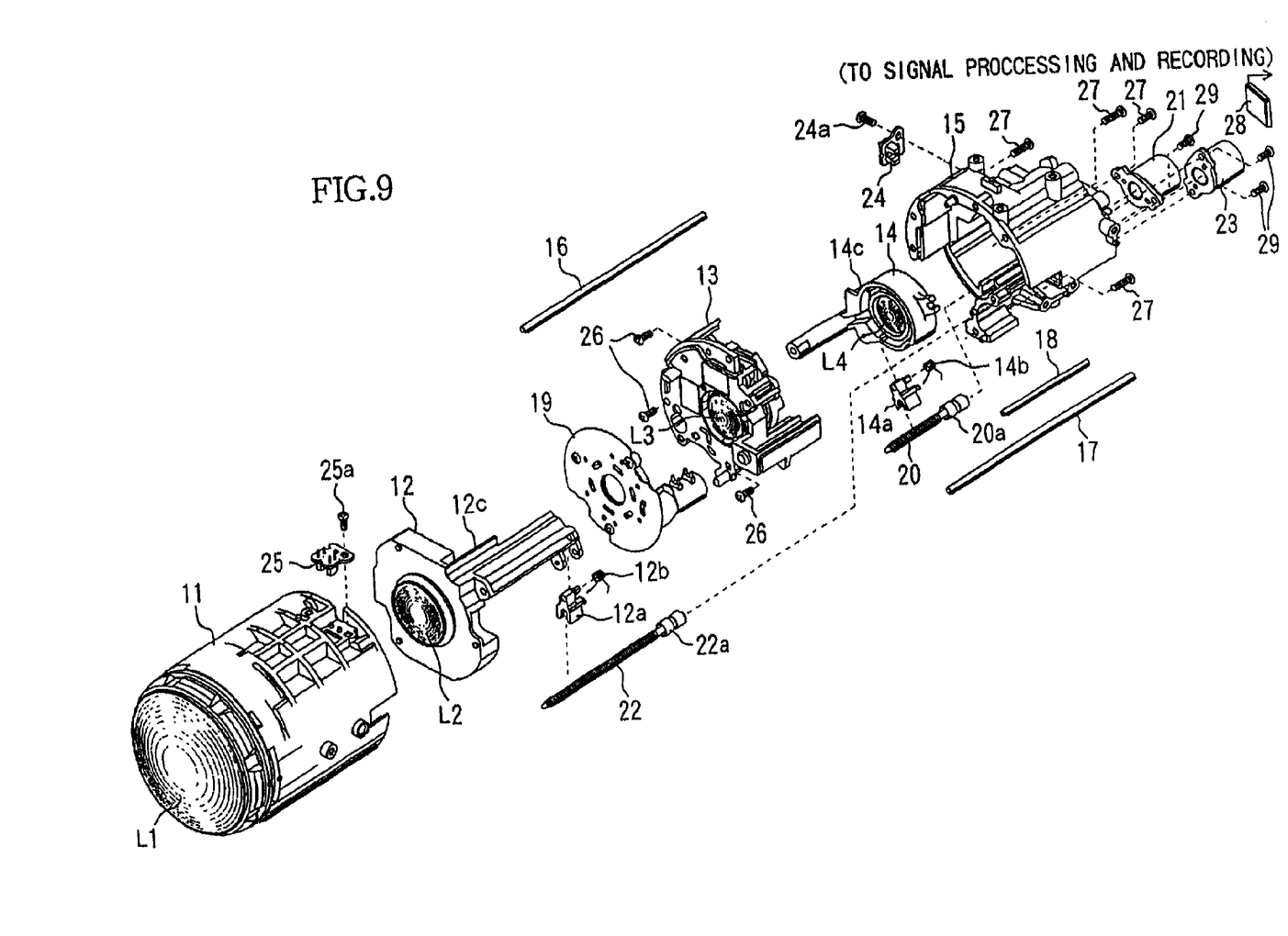
FIG. 9 is an exploded perspective view of a lens barrel including the iris type diaphragm device according to the above described embodiments.

FIG. 9 is an exploded view of a lens device including the iris type diaphragm device described in the above described embodiments. The lens device is provided in an image-taking apparatus such as a video camera or a digital still camera capable of taking moving images and still images.

In the drawing, reference numeral L1 denotes a fixed first lens group; L2, a second lens group that moves in an optical axis direction for zooming; L3, a third lens group that moves in a plane orthogonal to the optical axis for correcting image vibration; and L4, a fourth lens group that moves in the optical axis direction for focusing.

Reference numeral 11 denotes a front lens barrel unit holding the first lens group L1; 12, a second group moving frame holding the second lens group L2; 13, a shift unit allowing the third lens group L3 to move in the plane orthogonal to the optical axis; 14, a fourth group moving frame holding the fourth lens group L4; and 15, a rear lens barrel holding an image pickup device 28 such as a CCD or a CMOS. A subject image (optical image) formed on the image pickup device 28 is photoelectrically converted by the image pickup device 28. A signal output from the image pickup device 28 is processed by an unshown signal processing circuit, and recorded and stored in a recording medium such as a memory.

Reference numerals 16, 17 denote guide bars which guide the second group moving frame 12 in the optical axis direction and preventing rotation of the second group moving frame 12 in the plane orthogonal to the optical axis, and are positioned and fixed by the front lens barrel unit 11 and the rear lens barrel 15.

Reference numeral 18 denotes a guide bar which guides the fourth group moving frame 14 in the optical axis direction together with the guide bar 16 and preventing rotation of the fourth group moving frame 14 in the plane orthogonal to the optical axis, and are positioned and fixed by the shift unit 13 and the rear lens barrel 15.

The shift unit 13 is positioned on the rear lens barrel 15 and screwed from forward by three screws 26.

Reference numeral 19 denotes the iris type diaphragm device described in the above described embodiments that changes an opening diameter of an optical system. The diaphragm device 19 is placed immediately in front of the third lens group L3 and fixed to the shift unit 13.

The rear lens barrel 15 is positioned on the front lens barrel unit 11 and screwed from backward by three screws 27.

Reference numeral 20 denotes a lead screw which drives the fourth lens group L4 in the optical axis direction for focusing, to which a rotor magnet 20a is fixed. The rotor magnet 20a has bearing shapes at the front and the rear thereof, and is subject to multipolar magnetization to the rear.

Reference numeral 21 denotes a stepping motor stator unit which rotates the rotor magnet 20a, and the lead screw 20 is supported by the shift unit 13 and a bearing provided on the stepping motor stator unit 21. The lead screw 20 engages a rack 14a mounted to the fourth group moving frame 14, and the rotor magnet 20a is rotated to drive the fourth group moving frame 14 and the fourth lens group L4 in the optical axis direction.

The fourth group moving frame 14, the guide bars 16, 18, the rack 14a, and the lead screw 20 are biased by an energizing force of a torsion coil spring 14b, and rattles between them are eliminated.

Reference numeral 22 denotes a lead screw which drives the second lens group L2 in the optical axis direction for zooming, to which a rotor magnet 22a is fixed. The rotor magnet 22a has bearing shapes at the front and rear thereof, and is subject to multipolar magnetization to the rear.

Reference numeral 23 denotes a stepping motor stator unit which rotates the rotor magnet 22a, and the lead screw 22 is supported by the shift unit 13 and a bearing provided on the stepping motor stator unit 23. The lead screw 22 engages a rack 12a mounted to the second group moving frame 12, and the rotor magnet 22a is rotated to drive the second group moving frame 12 and the second lens group L2 in the optical axis direction.

The second group moving frame 12, the guide bars 16, 17, the rack 12a, and the lead screw 22 are biased by an energizing force of a torsion coil screw 12b, and rattles between them are eliminated.

Each of the stepping motor stator units 21, 23 is fixed to the rear lens barrel 15 by screws 29.

Reference numeral 24 denotes a focus reset switch including a photointerrupter, which outputs electric signals depending on switching between shading and transmitting of light by moving a shading portion 14c formed on the fourth group moving frame 14 in the optical axis direction. An unshown control circuit can detect, based on the electric signals, whether the fourth lens group L4 is in a predetermined reference position. The focus reset switch 24 is fixed to the rear lens barrel 15 via a substrate by a screw 24a.

Reference numeral 25 denotes a zoom reset switch including a photointerrupter, which outputs electric signals depending on switching between shading and transmitting of light by moving a shading portion 12c formed on the second group moving frame 12 in the optical axis direction. An unshown control circuit can detect, based on the electric signals, whether the second lens group L2 is in a predetermined reference position. The zoom reset switch 25 is fixed to the front lens barrel unit 11 via a substrate by a screw 25a.

The above described embodiments are illustrative only, and the invention can be applied to configurations other than the embodiments. For example, the diaphragm device having the six aperture blades are described in the embodiments, but the invention can be applied to an iris type light quantity adjusting device having three to five aperture blades or seven or more aperture blades.

As described above, in the above described embodiments, at least one shading blade among the plurality of shading blades has the extended portion to keep the overlapping order in the optical axis direction with the other shading blade that pivots around the shaft not adjacent to the shaft as a pivot of the aforementioned at least one shading blade in the circumferential direction of the fixed opening, and all the shading blades are formed such that each outer edge at the outside in the direction orthogonal to the optical axis and the peripheral edge of the fixed opening intersect at one or none point within an entire pivoting range, thereby preventing the tip of the shading blade (especially, the extended tip) from extending toward the opposite side of the fixed plate through the fixed opening and from catching the peripheral edge of the fixed opening.

Further, all the shading blades are formed such that one of the shading blades approaching from the substantially opposite directions in the direction orthogonal to the optical axis during closing pivoting does not overlap the other shading blade at the tip thereof in the closed position, thereby preventing change between the upper and lower positions of the shading blades caused by overlapping between the shading blades and thus preventing occurrence of a state where closing is disabled.

Therefore, each of the above described embodiments provides the iris type light quantity adjusting device that does not change the overlapping order of the shading blades even in high speed driving by shutter operation, and prevents interference or catch between the shading blades or to the fixed opening even if the tip of the shading blade is somewhat deflected or raised by driving, and allows reliable and smooth opening and closing.

While preferred embodiments have been described, it is to be understood that modification and variation of the present invention may be made without departing from the sprit or scope of the following claims.

What is claimed is:

1. An iris type light quantity adjusting device comprising:
    a fixed member, said fixed member having a fixed opening for light to pass through, and a plurality of shafts being placed around said fixed opening;
    a plurality of shading blades, each shading blade pivoting around each shaft outward and inward in a direction orthogonal to an optical axis to adjust quality of light passing through said iris type light quantity adjusting device,
    wherein at least one shading blade among said plurality of shading blades has extended portion overlapping the other shading blade in order to keep overlapping order in an optical axis direction with said other shading blade that pivots around the shaft not adjacent to the shaft as a pivot of said at least one shading blade in the circumferential direction of said fixed opening,
    each of said plurality of shading blades has one or none intersection between an outer edge of said shading blade at an outside in the direction orthogonal to the optical axis and a peripheral edge of said fixed opening within an entire pivoting range of each of said shading blades, and
    one of a pair of shading blades approaching from substantially opposite directions in the direction orthogonal to the optical axis during pivoting to a closing direction has, at the tip thereof, a shape not overlapping the other shading blade in a closed position.
    said one of the pair of shading blades approaching from said sustantially opposite directions during pivoting the the closing direction may overlap, at the tip thereof, said other shading blade by further pivoting from the closed position to the closing direction.

2. The iris type light quantity adjusting device according to claim 1, wherein said one of the pair of shading blades approaching from said substantially opposite directions during pivoting to the closing direction may overlap, at the tip thereof, said other shading blade by further pivoting from the closed position to the closing direction.

3. The iris type light quantity adjusting device according to claim 1, further comprising:
    a holding member, said holding member being fixed on said fixed member, wherein said plurality of shading blades are disposed between said holding member and said fixed member.

4. The iris type light quantity adjusting device according to claim 1, wherein said plurality of shading blades consist of three kinds of shading blades: a first shading blade; a second shading blade corresponding to said first shading blade with said extended portion formed on the tip side thereof; and a third shading blade corresponding to said first shading blade with said extended portion formed on the base side thereof.

5. The iris type light quantity adjusting device according to claim 1, wherein said plurality of shading blades consist of two kinds of shading blades: a first shading blade; and a second shading blade corresponding to said first shading blade with said extended portions formed on the tip side and the base side thereof.

6. The iris type light quantity adjusting device according to claim 1, wherein said plurality of shading blades consist of one kind of shading blade with said extended portions formed on the tip side and the base side thereof.

7. A lens device comprising:
    an image-taking optical system, said system forming an optical image by emitted light flux; and
    an iris type light quantity adjusting device as set forth in claim 1, said light quantity adjusting device being placed in said image-taking optical system.

8. An iris type light quantity adjusting device comrprising:
    a fixed member, said fixed member having a fixed opening for light to pass through, and a plurality of shafts being placed around said fixed opening;
    a plurality of shading blades, each shading blade pivoting around each shaft outward and inward in a direction orthogonal to an optical axis to adjust quality of light passing through said iris type light quantity adjusting device,
    wherein at least one shading blade among said plurality of shading blades has extended portion overlapping the other shading blade in order to keep overlapping order in an optical axis direction with said other shading blade that pivots around the shaft not adjacent to the shaft as a pivot of said at least one shading blade in the circumferential direction of said fixed opening, each of said plurality of shading blades has one or none intersection between an outer edge of said shading blade at an outside in the direction orthogonal to the optical axis and a peripheral edge of said fixed opening within an entire pivoting range of each of said shading blades, said plurality of shading blades consist of two kinds of shading blades: a first shading blade; and a second shading blade corresponding to said first shading blade with said extended portions formed on the tip side and the base side thereof; and one of pair of shading blades approaching from substantially opposite directions in the direction orthogonal to the optical axis during pivoting to a closing direction has, at the tip thereof, a shape not overlapping the other shading blade in a closed position.

9. A lens device comprising:

an imaging-taking optical system, said system forming an optical image by emitted light flux; and an iris type light quantity adjusting device as set forth in claim 8, said light quantity adjusting device being placed in said image-taking optical system.

10. An image-taking apparatus comprising:

a lens device as set forth in claim 9; and an image-taking unit, said unit recording an optical image formed by said image-taking optical system of said lens device on an image recording medium.

* * * * *